(12) United States Patent
Bentley

(10) Patent No.: US 6,742,840 B2
(45) Date of Patent: Jun. 1, 2004

(54) ADJUSTABLE SEATS

(75) Inventor: Paul Bentley, Gainesville, TX (US)

(73) Assignee: Weber Aircraft LP, Gainesville, TX (US)

( * ) Notice: Subject to any disclaimer, the term of this patent is extended or adjusted under 35 U.S.C. 154(b) by 0 days.

(21) Appl. No.: 09/865,841

(22) Filed: May 25, 2001

(65) Prior Publication Data
US 2002/0175547 A1 Nov. 28, 2002

(51) Int. Cl.$^7$ ............................... A47C 1/02
(52) U.S. Cl. ................ 297/316; 297/318; 297/322; 297/317
(58) Field of Search ............... 297/318, 321, 297/322, 316, 317, 341, 342, 312, 320, 146

(56) References Cited

U.S. PATENT DOCUMENTS

| | | | |
|---|---|---|---|
| 1,790,468 A | * | 1/1931 | Frank et al. |
| 2,098,426 A | * | 11/1937 | McDonald |
| 2,479,175 A | | 8/1949 | McArthur |
| 2,619,395 A | * | 11/1952 | Kent |
| 2,963,078 A | * | 12/1960 | Ferrelle |
| 3,773,381 A | | 11/1973 | Brennan |
| 3,806,192 A | * | 4/1974 | Ohlrogge et al. |
| 3,883,173 A | * | 5/1975 | Shephard et al. |
| 4,511,178 A | * | 4/1985 | Brennan |
| 5,050,931 A | | 9/1991 | Knoblock |
| 5,133,587 A | | 7/1992 | Hadden, Jr. |
| 5,401,077 A | * | 3/1995 | Hosoe |
| 5,536,067 A | * | 7/1996 | Pinto |
| 5,806,930 A | | 9/1998 | Knoblock |
| 6,237,994 B1 | | 5/2001 | Bentley et al. |
| 6,334,648 B1 | * | 1/2002 | Girsberger et al. |

FOREIGN PATENT DOCUMENTS

| | | | |
|---|---|---|---|
| DE | 3541299 | * | 5/1987 |
| DE | 19631455 | | 2/1998 |
| EP | 1044877 | | 10/2000 |
| GB | 2327871 | | 2/1999 |
| JP | 58-36732 | * | 3/1983 |
| TW | 367755 | | 8/1999 |

OTHER PUBLICATIONS

"Pain Be Gone," Code Nast Traveler, May 2001, pp. 139–140 and 147–148.

* cited by examiner

Primary Examiner—Laurie K. Cranmer
(74) Attorney, Agent, or Firm—Dean W. Russell; Kilpatrick Stockton LLP

(57) ABSTRACT

Adjustable seats and components thereof are detailed. The seats, particularly (although not exclusively) useful in commercial aircraft, permit substantial angular recline without the corresponding rearward linear movement necessarily occurring in conventional seats. The seats additionally may have discontinuous, or non-integral, seat bottoms, with the heights of the forward portions of the bottoms being adjustable mechanically. Tray tables optionally associated with the seats further omit any central slot and may define one or more pivot axes in locations different than exist in conventional seats.

15 Claims, 11 Drawing Sheets

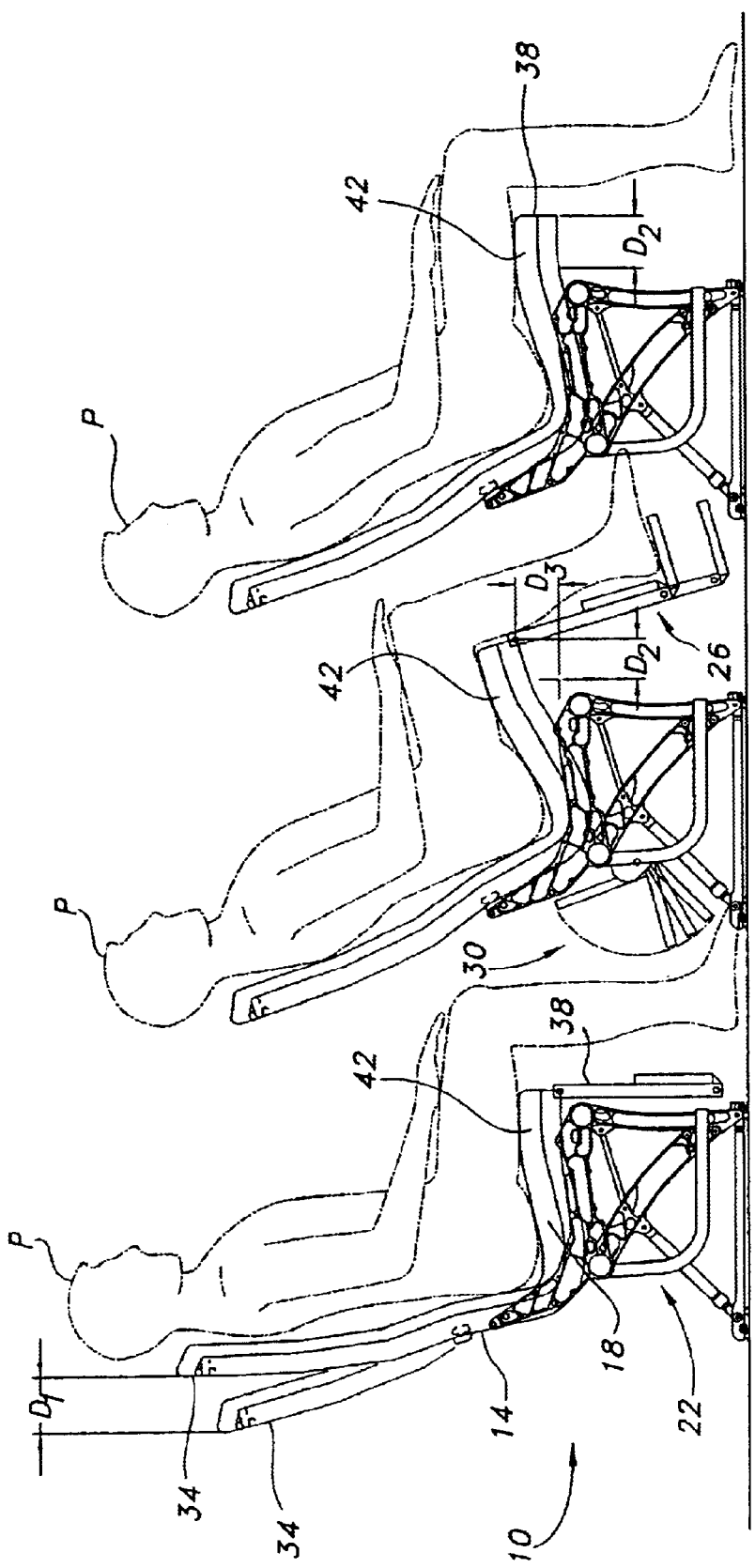

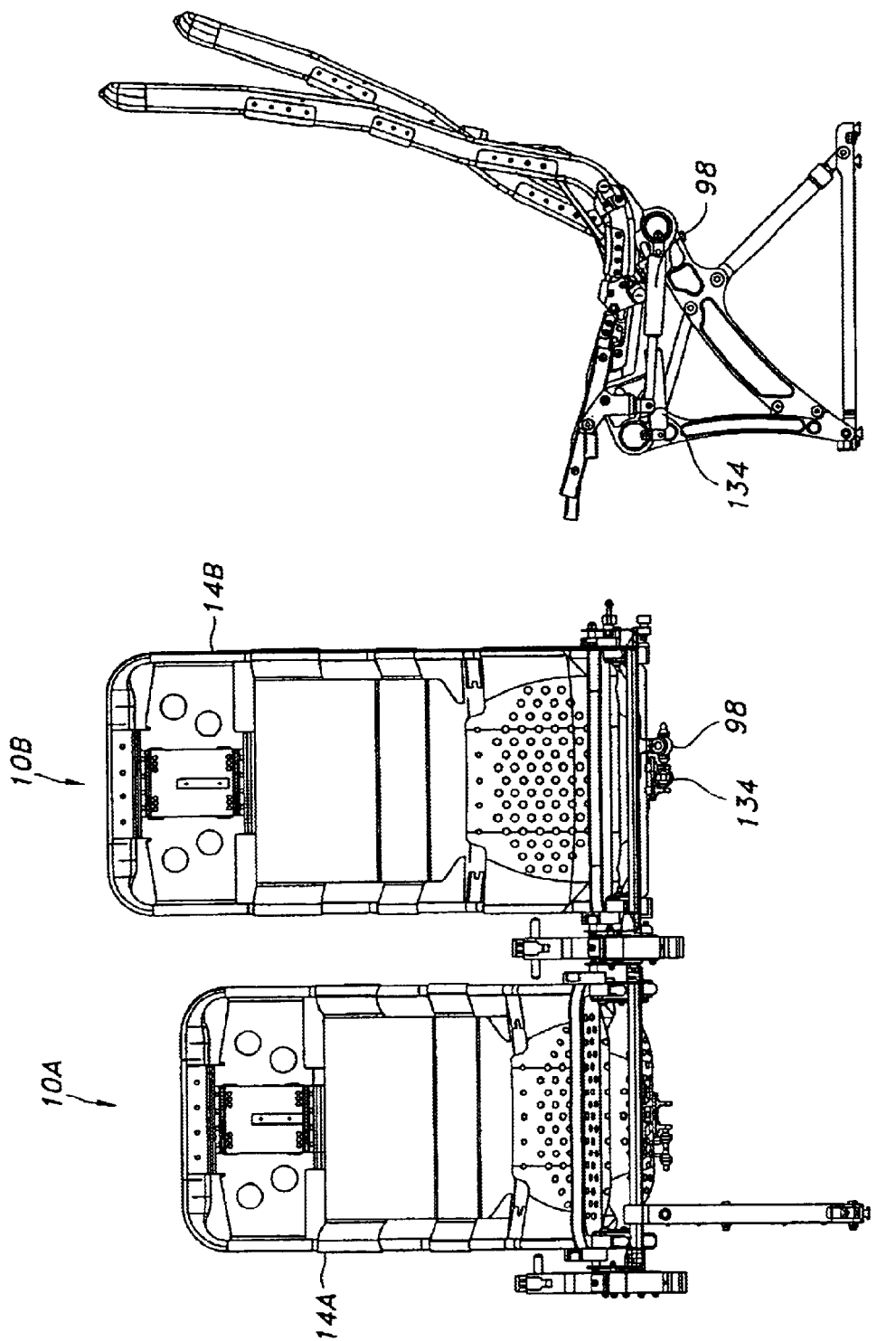

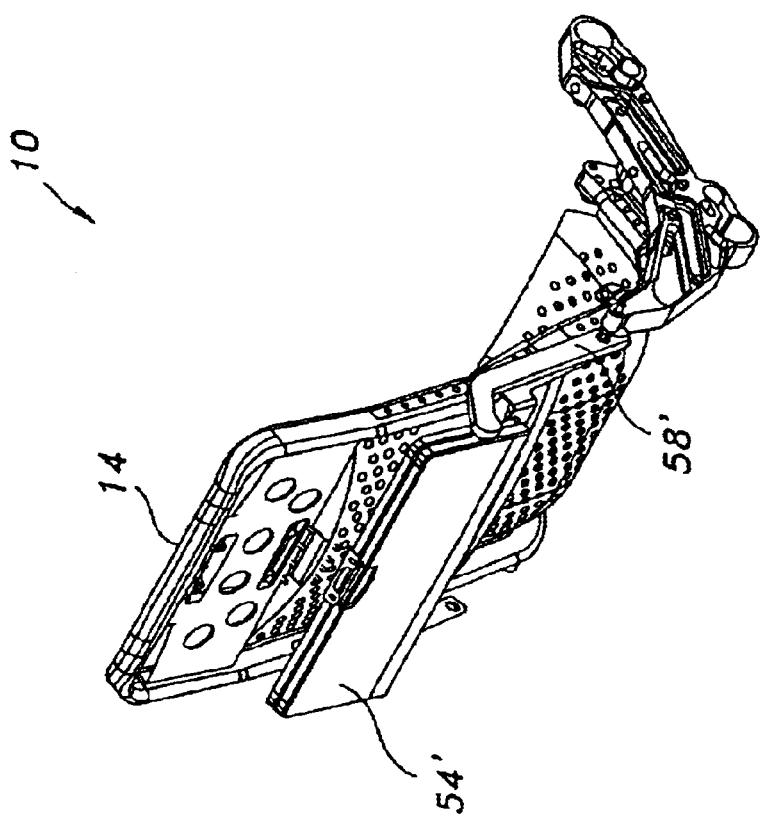
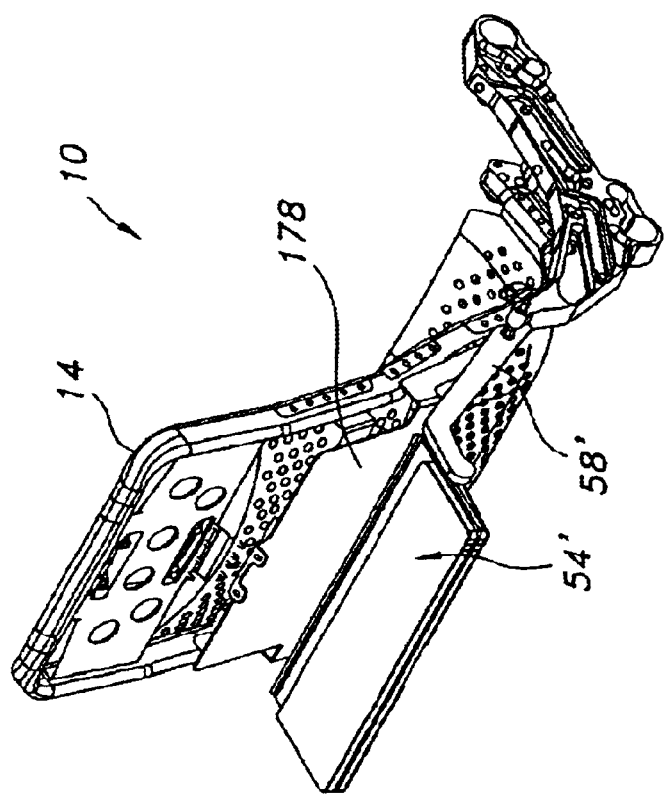
FIG. 9B
FIG. 9A

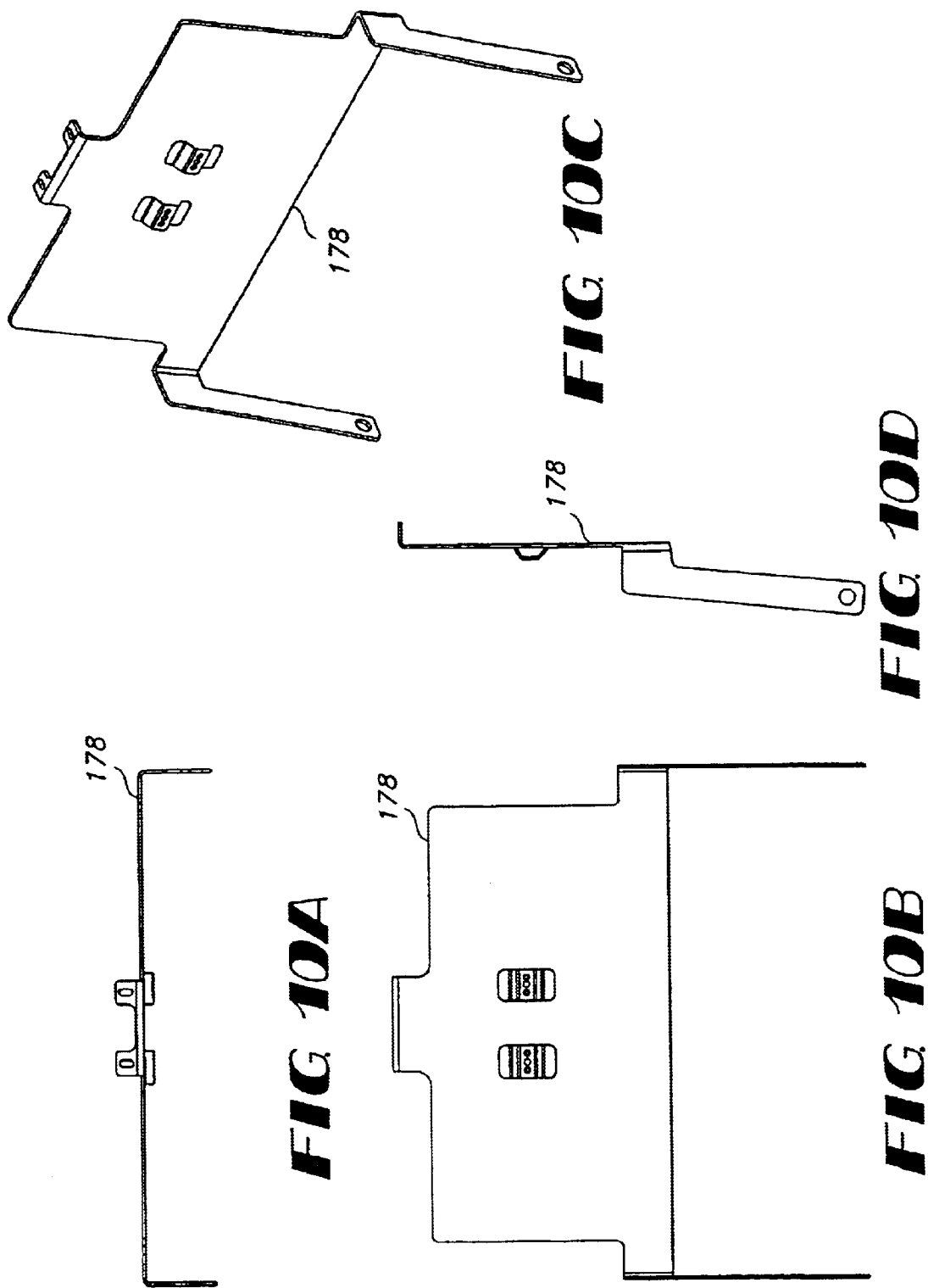

ADJUSTABLE SEATS

FIELD OF THE INVENTION

This invention relates to adjustable seats and components thereof, including but not limited to tray tables, and more particularly (although not exclusively) to aircraft passenger seats designed to enhance comfort of both the occupants and those persons positioned in seats behind the innovative seats described herein.

BACKGROUND OF THE INVENTION

Increasing comfort of seat-bound passengers, especially on long-haul flights, remains a significant objective of many commercial airlines. A recent article from the May 2001 issue of Conde Nast Traveler, entitled "Pain Be Gone!" (the "Conde Nast Article") details some of the difficulties associated with conventional coach-class aircraft seats. Noted in the Conde Nast Article is that > the conventional seat is an L with the back hinged at seat level. When [a passenger presses] the recline button, the back just tilts backward from the hinge point, or pivot. The seat itself remains where it was. This tends to put the body into a state of stress known as shear[,] decreasing the overall comfort of the passenger. Recognized as well in the Conde Nast Article is that an "ideal" pivot point for a reclinable seat is "at the axis of the seat's ideal rotating movement," with a seat so configured functioning, in some respects, as a cradle or hammock.

Commonly-owned U.S. patent application Ser. No. 09/329,854 of Bentley, et al., which has been allowed and had its issue fee paid, discloses various multi-function passenger seats differing from the simple "L"-shaped structure described above. As noted in the Bentley application:

> In addition to providing "rocking" motion . . . , seats of the . . . invention may enhance passenger comfort by having bottoms whose lengths are adjustable, allowing passengers to match the effective lengths of their seat bottoms more closely with the lengths of their upper legs. Tables stowable in the seats additionally are adjustable vertically, moving food or other substances or materials closer to mouths and further from legs of seat occupants (or vice-versa) as desired . . . Each of these aspects of the seats and systems of the invention is intended to improve comfort-related performance of seats used commercially for transportation, whether in aircraft, land-based vehicles, or otherwise.

See Bentley at p. 3, 11. 7–21.

U.S. Pat. No. 5,133,587 to Hadden, Jr. details other adjustable seats. Discussed in the Hadden, Jr. patent are two types of bucket seats, one (shown in FIG. 8) having a hinge between an upper backrest and a lower seat portion and the other (shown in FIG. 13) lacking such a hinge. In either version the seat portion is integral, with a "flexible forward diaphragm" extending from the front portion thereof. According to the Hadden, Jr. patent, the flexible diaphragm is not mechanically adjustable, instead merely being "depressible downwardly" by a passenger's legs. See Hadden, Jr., col. 7, 11. 23–29.

Also disclosed in the Hadden, Jr. patent are upper and lower track members, the upper tracks connected to the upper backrest and the lower tracks connected to the lower seat portion. Received in the tracks, which appear similar to those illustrated in the Conde Nast Article, are followers in the form of rollers. The combined rollers and tracks "facilitate seat adjustability while reducing corresponding encroachment on adjacent space," coordinating movement of the entire seat rather than merely its backrest.

Further described in the Hadden, Jr. patent is a tray table positioned in the rear of the backrest. Incorporated centrally into the table is an elongated slot. When the table is not deployed, the slot is engaged by a "T" member attached to the seat bucket, with the "T" member permitted to move within the slot when the attitude of the seat changes.

SUMMARY OF THE INVENTION

The present invention provides adjustable seats and components differing not only from conventional "L"-shaped seats, but also from the designs detailed in the Hadden, Jr. and other patents. By contrast with the seats of the Hadden, Jr. patent, for example, those of the invention may have a discontinuous (or non-integral) seat bottom, although the interface itself between the bottom and backrest may remain continuous. Included among other aspects of the innovative seats are mechanically-adjustable forward portions of the seat bottoms, which may be locked in position as selected by the passenger. Thus, unlike the mere "flexible forward diaphragm" of the Hadden, Jr. patent, the forward portions of seat bottoms of the present invention may be both adjusted by passengers and fixed in position once adjusted.

Seats as described herein, while able to rotate, additionally are adapted for greater forward translation than heretofore occurs. Such translation is available in part because tracks and followers of the present seats are located differently than as described in the Hadden, Jr. patent, with all tracks moved from the backrest portion of the chair essentially to the lower, or bottom, portion. Resulting is a seat that moves farther forward relative to its base when "reclined," reducing inconvenience of the passenger seated directly behind the one reclining. Indeed, in some embodiments of the invention, the backrest may recline as much as 16° (from, e.g., 15° off vertical to 31°) yet have a linear rearward position change of less than four and one-half inches, substantially less than occurs today.

The present invention additionally extends to tray tables and mechanisms. Unlike those of the Hadden, Jr. patent, no central slot exists in the tables of the invention, enhancing the reliability, functionality, and appearance of the tables. In one version, embodied within the tables are movable pins which engage slots attached to side or, preferably, rear surfaces of the seats when the tables are not deployed. When a backrest is moved under these circumstances, the pins of the table are permitted to slide within the slots. To deploy tray tables, passengers need merely rotate knobs (or otherwise act upon alternative devices) to disengage the pins from the slots. In another version, a frame distinct from (but attached to) the seat includes both a table and latching mechanism, with a pin in the tray table engaging a slot present within the seat back.

Versions of tray tables described in this document further may include slots in their sides so permit the tables to slide toward a passenger in use and away from the passenger for stowage. Unlike existing trays, neither these slots nor the axis about which the tables pivot need be positioned at or adjacent an end of the trays. Instead, the trays may pivot about an axis closer to the mid-sections. Additionally, tray tables consistent with the invention may be bi-fold, in essence defining two pivot axes rather than one. So structuring the trays may be advantageous in some circumstances, where little height of the chair back is available for stowing them.

It thus is an object of the present invention to provide alternatives to existing adjustable seats.

It is also an object of the present invention to provide seats adapted for greater forward translation than conventional aircraft seats.

It is a further object of the present invention to provide seats having discontinuous, or non-integral, bottom portions, with the forward parts being adjustable mechanically.

It is another object of the present invention to provide seats with tracks permitting adjustment of both the bottoms and backrests located essentially in their bottom portions.

It is yet another object of the present invention to provide tray tables omitting central slots.

It is, moreover, an object of the present invention to provide tray tables having pins adapted to be received by, and slide within, slots protruding from seat backs.

It is an additional object of the present invention to provide bi-fold tray tables and other components of table assemblies.

Other features, advantages, and objects of the present invention will be apparent to those skilled in the art with reference to the remaining text and drawings of this application.

BRIEF DESCRIPTION OF THE DRAWINGS

FIGS. 1A–C illustrate an exemplary seat of the present invention in various positions.

FIG. 6A is a rear view of portions of two connected seats consistent with FIG. 1.

FIG. 6B provides yet another partial cross-sectional view of the seat of FIG. 1.

FIGS. 9A–B illustrate an alternative tray table mechanism useful in connection with the seat of FIG. 1.

FIGS. 10A–D further illustrate portions of the alternative tray table mechanism of FIGS. 9A–B.

DETAILED DESCRIPTION

Figures 2A, 2B, 2C:
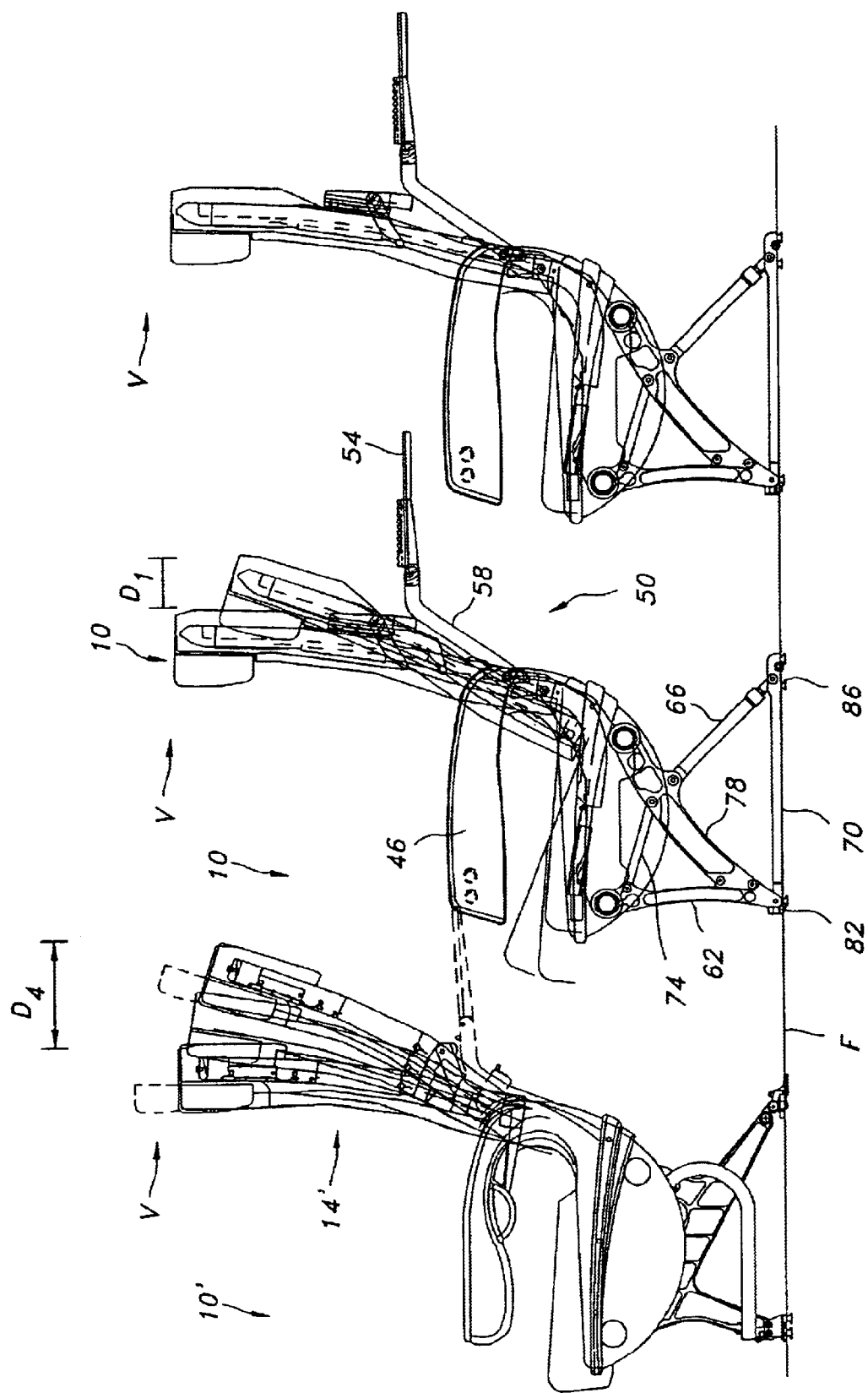
FIGS. 2A–C provide comparisons of the seat of FIG. 1 and an alternative seat.

FIGS. 1A–C illustrate various possible positions of an exemplary seat 10. Seat 10 may include generally vertically-oriented backrest 14 and generally horizontally-oriented seat bottom 18. Although preferred configurations of seat 10 are described herein, seat 10 may have backrest 14 and bottom 18 connected in any appropriate manner or integrally formed. Also shown in FIGS. 1A–C are base frame 22 and alternative adjustable footrests 26 and 30, either of which optionally may be incorporated as part of seat 10. Those skilled in the art will, however, recognize that base frame 22 need not appear identical to that shown in FIGS. 1A–C and that, if seat 10 includes a footrest, such footrest may differ from either footrest 26 or footrest 30.

Depicted in solid lines in FIG. 1A is backrest 14 in its nominal "upright" position. In this position, backrest 14 traditionally is at an angle of approximately 15° off a vertical axis V (FIGS. 2A–C). Phantom lines show backrest 14 in its nominally fully "reclined" position of approximately 31° off axis V. In multiple embodiments of seat 10, rearwardmost point 34 of backrest 14 changes a distance $D_1$ of only approximately four to 4.37 inches linearly, notwithstanding that backrest 14 is moved angularly approximately 16° between the upright and fully reclined positions. As further described herein in connection with FIGS. 2A–C, this modest linear change during such a large angular change represents a substantial comfort-enhancing improvement over existing seats.

Illustrated in FIGS. 1B–C is the forward translation achieved by seat 10 when backrest 14 is reclined. By contrast with FIG. 1A, in which forwardmost point 38 of bottom 18 is proximate base frame 22, FIGS. 1B–C show forwardmost point 38 a significant linear distance $D_2$ forward of frame 22. Such distance $D_2$ preferably is approximately 3.10 inches, sufficiently small as not to diminish comfort of passenger P. However, although various preferred numerical values have been provided for distances $D_1$ and $D_2$ and the angular motion of backrest 14, these values may vary as appropriate or desired depending, at least in part, on the results sought to be obtained.

FIGS. 1B–C additionally detail differing exemplary positionings of forward portion 42 (sometimes called the "bull nose") of bottom 18. Although shown only schematically, such exemplary positionings may, for example, include a lower position in which portion 42 is proximate base frame 22 and an upper position in which portion 42 is raised a distance $D_3$ above frame 22. FIG. 1C illustrates forward portion 42 in its lower position, while FIG. 1B depicts portion 42 in an upper position. Embodiments of the invention allow passenger P to vary the distance $D_3$ based on personal preference, although such variation need not necessarily occur or, instead, may be pre-set before use.

FIG. 2B provides additional information about exemplary seat 10. Shown in FIG. 2B are arm rest 46 and tray table mechanism 50, either or both optionally included as part of the seat 10. Mechanism 50 itself may comprise at least tray table 54 and arms 58, two of which typically connect table 54 to one of backrest 14, bottom 18, or base frame 22. Frame 22, further, may comprise forward vertical member 62, rear inclined member 66, horizontal spreader 70, and intermediate members 74 and 78, with securing members 82 and 86 facilitating connecting seat 10 to the floor F of an aircraft cabin or any other surface. Base frame 22 alternatively may be constructed as shown either in FIG. 2A or in the Hadden, Jr. patent or in any other suitable manner.

FIG. 2A shows, for comparison, another type of seat 10'. As illustrated, seat 10' includes a backrest 14' adapted to recline up to 31° off vertical axis V. When fully reclined, backrest 14' has extended rearward a linear distance $D_4$ of approximately 7.40 inches. By contrast, and as noted earlier, backrest 14 (FIG. 2B) extends rearward distance $D_1$ of less than approximately 4.37 inches, notwithstanding that it achieves the same final recline angle of 31° off of axis V. As a consequence, a passenger seated directly behind seat 10 retains substantially more seating area space when seat 10 is reclined than does a passenger seated directly behind seat 10'. FIG. 2C, finally, superimposes seats 10 and 10' when backrests 14 and 14' are in the upright position, confirming the positioning of a passenger P in such case can be substantially the same in either seat 10 or 10'.

Figure 3:
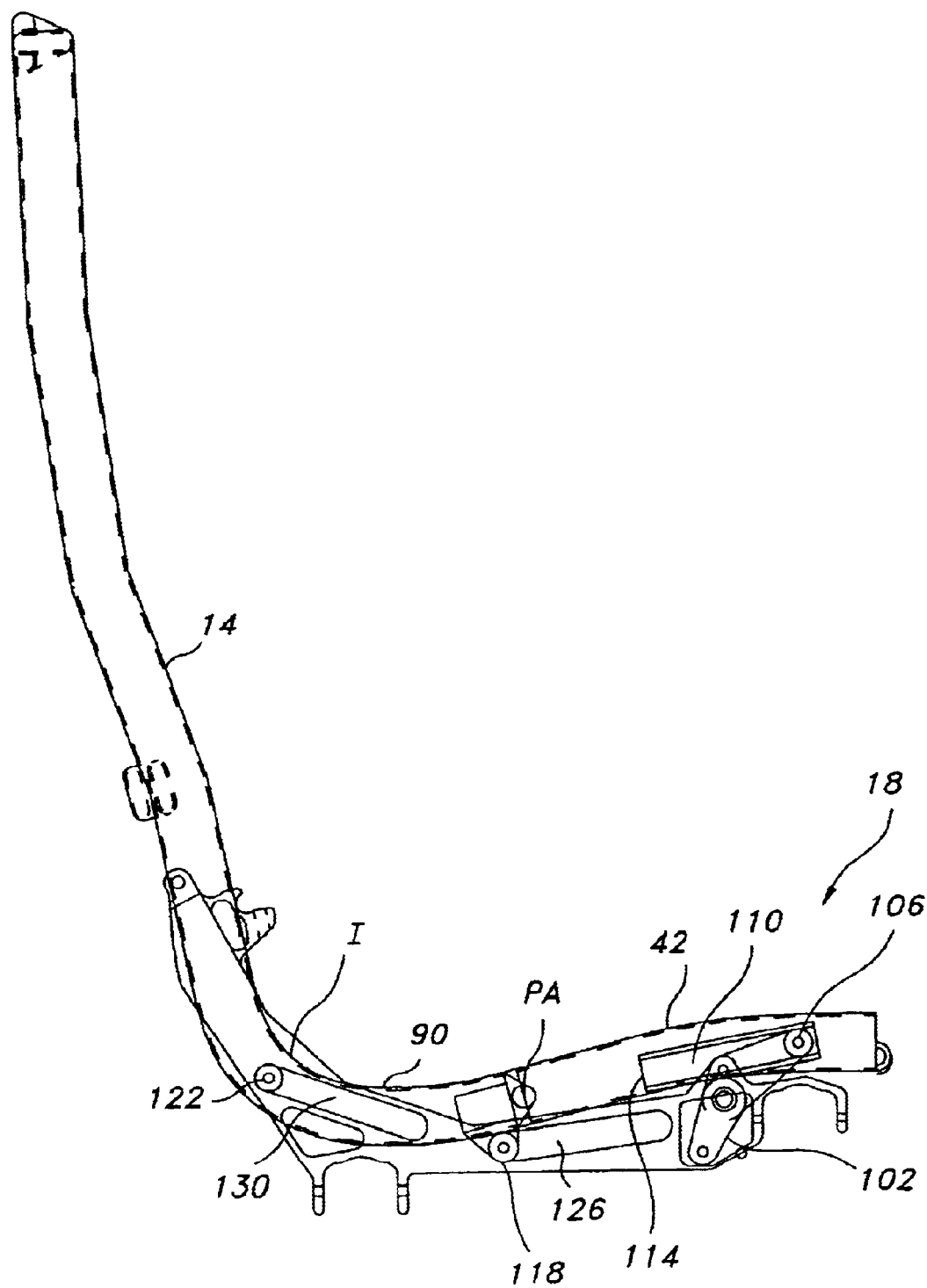
FIG. 3 presents a partial cross-sectional view of the seat of FIG. 1.
Figure 4:
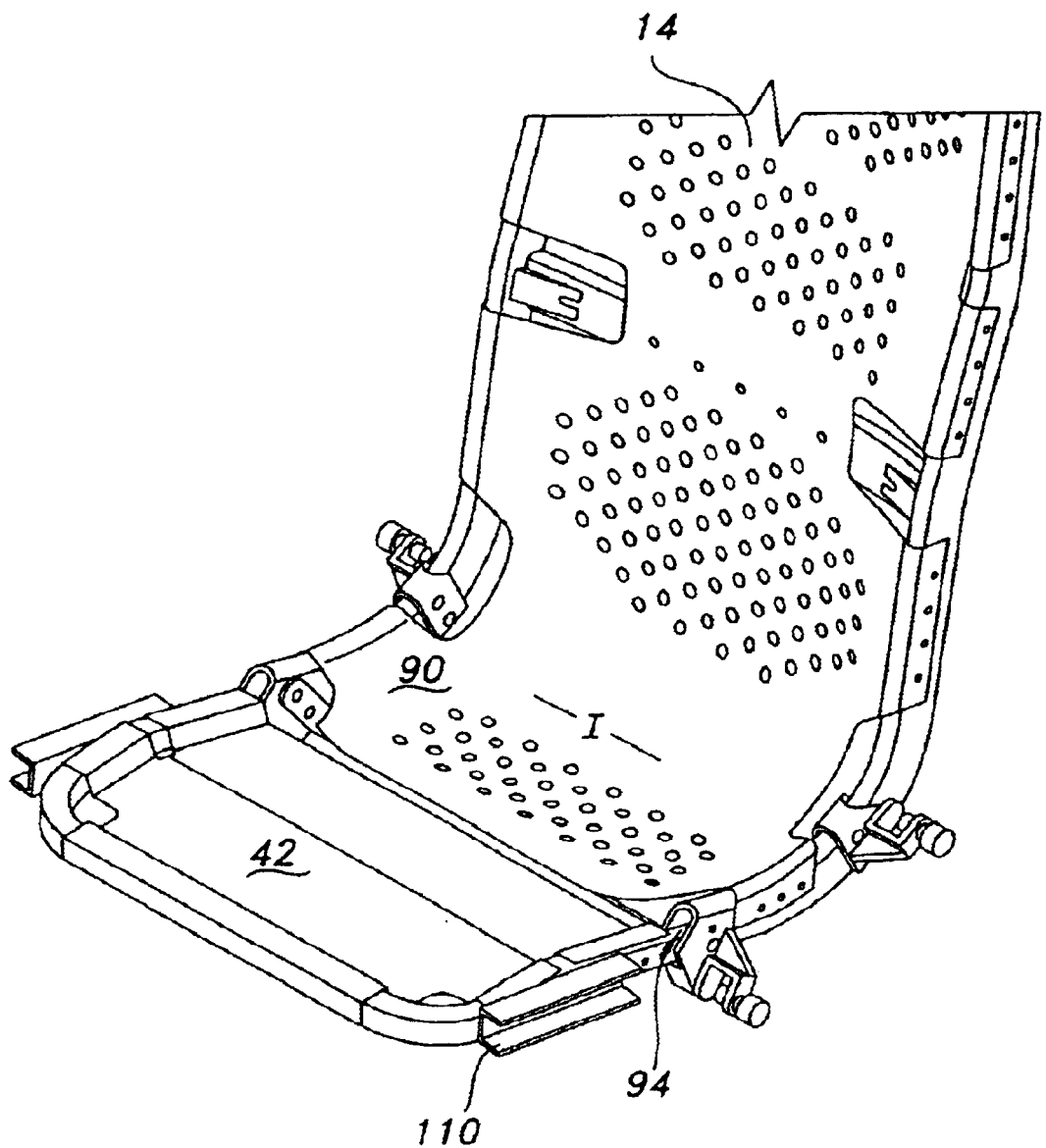
FIG. 4 is a perspective view of part of the seat of FIG. 1.

FIGS. 3–4 illustrate the general bucket style of seat 10. In the version of seat 10 shown in these drawings, bottom 18 comprises distinct forward portion 42 and rear portion 90, the latter of which may be integral with backrest 14. Thus, seat 10 may differ from both seats depicted in the Hadden, Jr. patent, as bottom 18 is both multi-part and lacking any hinge at interface I where rear portion 90 abuts backrest 14.

To allow forward portion 42 to raise and lower respecting base frame 22, portion 42 may pivot with respect to rear portion 90 about axis PA, which extends into the plane of the paper on which FIG. 3 appears. Parts of a suitable pivot mechanism 94 are shown in FIG. 4, although those skilled in the art will recognize that multiple different such mechanisms alternatively may be employed. Exemplary mechanism 94 additionally may include conventional hydrolock 98 (FIGS. 6A–B), which operates on bell crank 102 and changes the position of forward rollers 106 in forward tracks 110 (typically one on each side of seat 10). In this way, actuation of hydrolock 98 (as, for example, by passenger P) causes forward portion 42 to raise away from base frame 22 until either hydrolock 98 is deactuated (by either the passenger or a mechanical or electrical stop) or forward rollers 106 reach rear ends 114 of tracks 110. Forward portion 42 may be locked in any such raised position if desired, and may be lowered either by the force of the passenger's legs overcoming the lock or by electrically or mechanically releasing the lock.

Alternatively, hydrolock 98 may be omitted (or simply not used) in favor of a spring or other resilient means connected directly or indirectly to forward portion 42. Typically, the spring or other mechanism would bias forward portion 42 upward. If so, its force would be counteracted (partially or completely) by the weight of a passenger's legs, in a manner somewhat analogous to the operation of some conventional theatre seats. Embodiments consistent with this alternative likely would not permit forward portion 42 to lock in any particular position, although conceivably such locking could occur.

FIG. 3 also details center rollers 118 and aft rollers 122, each set designed to move cooperatively in corresponding tracks 126 and 130, respectively. Such cooperative movement is similar to that described in the Hadden, Jr. patent in connection with its rollers and track members. Unlike the mechanisms of the Hadden, Jr. patent, however, all of rollers 118 and 122 and tracks 126 and 130 are positioned near bottom 18; consequently, aft rollers 122 are substantially closer to both base frame 22 and bottom 18 than are the upper rollers of the seats of the Hadden, Jr. patent. This configuration permits greater forward linear motion of seat 10 than does that of the Hadden, Jr. patent, one of many advances of the present invention. Once again, although roller and track assemblies are discussed in connection with seat 10, those skilled in the art will understand that other guides or followers may be employed.

Figure 5:
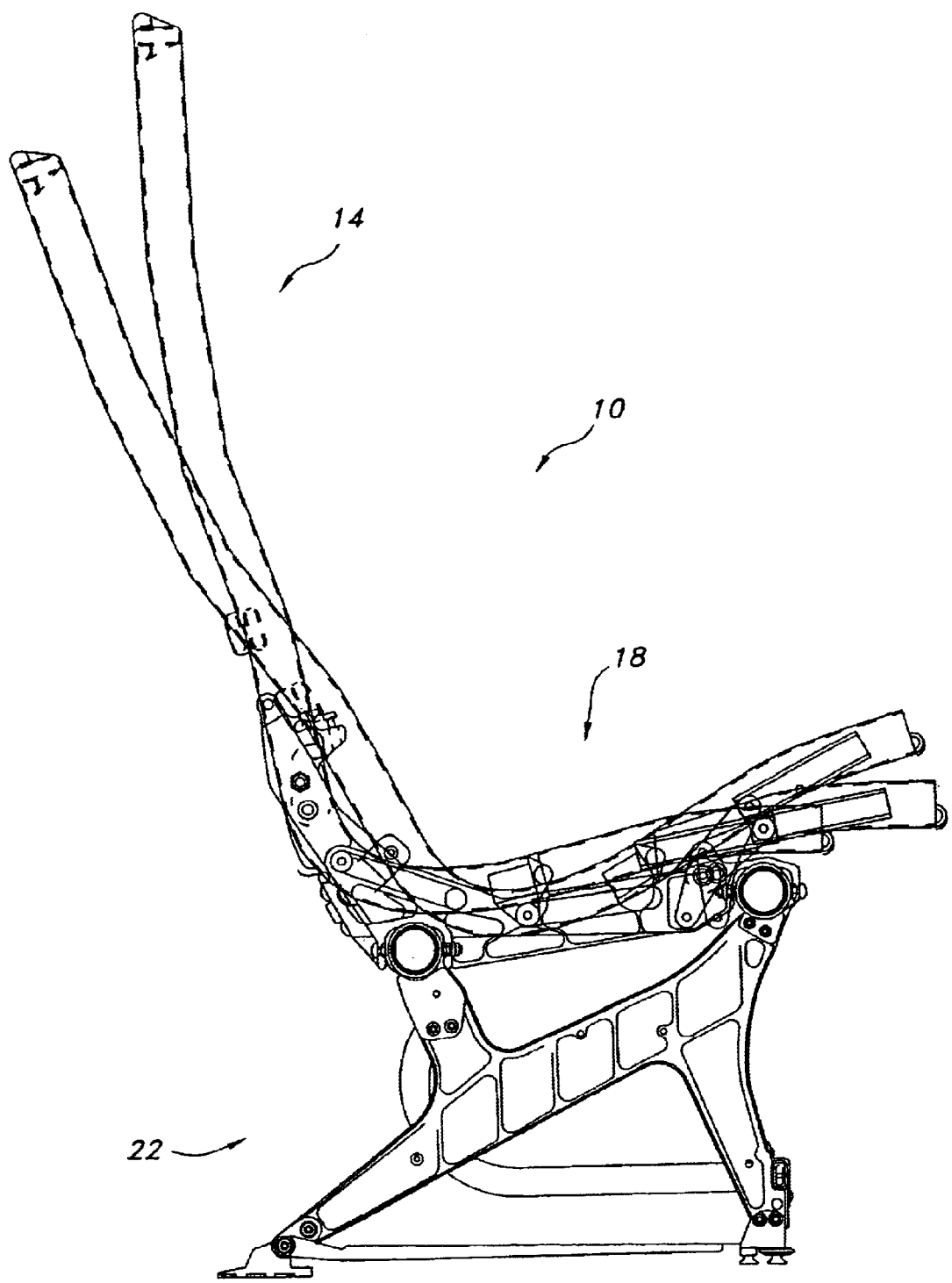
FIG. 5 is another partial cross-sectional view of the seat of FIG. 1.

FIGS. 5 and 6A–B supply yet additional details concerning a preferred structure of seat 10. FIG. 6A, in particular, illustrates rears of a pair of connected seats 10A and 10B, with backrest 14A of seat 10A reclined and backrest 14B of seat 10B upright. Seats 10 may be connected in sets of two, three, four, or more as desired; indeed, typical long-haul aircraft flying today include coach-class cabins admitting any of these sets. Hydrolock 134, also shown in FIGS. 6A–B, may be used in conjunction with rollers 118 and 122 and tracks 126 and 130 to control rotational and translational movement of backrest 14 and bottom 18 and lock seat 10 in a desired position. Hydrolock 134 advantageously may be activated when the passenger depresses a button on seat 10, although other actuation mechanisms may be utilized.

Figure 7A:
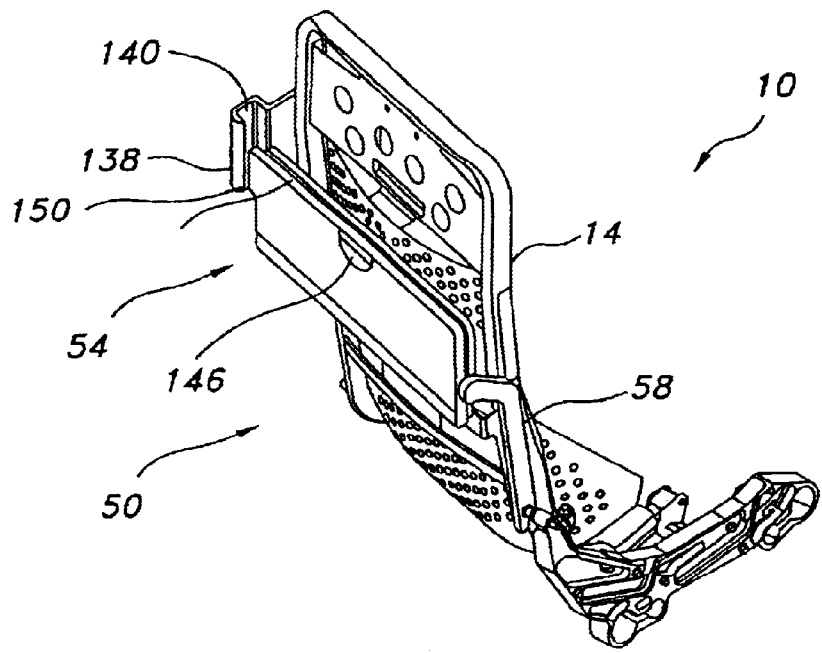
FIGS. 7A–D show a tray table mechanism useful in connection with the seat of FIG. 1.
Figure 7B:
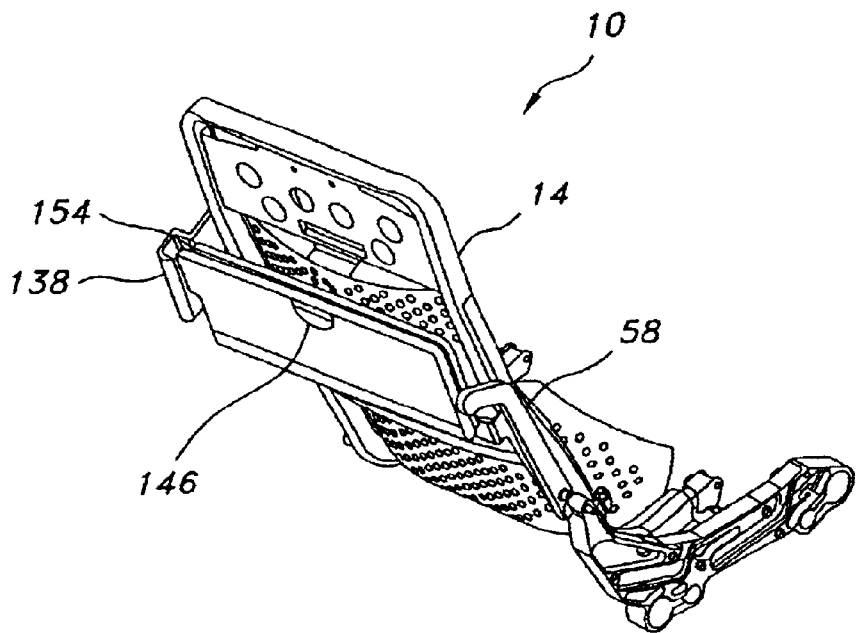

Tray table mechanism 50 appears in FIGS. 7A–D. FIGS. 7A–B show tray table 54 in its undeployed condition, latched to the rear of backrest 14 and folded along axis FA.

Also illustrated in FIGS. 7A–D is a slot-containing member 138 connected to and extending behind backrest 14. Although preferably two members 138, one on each side of backrest 14, are present, only one such member is shown.

Figure 8:
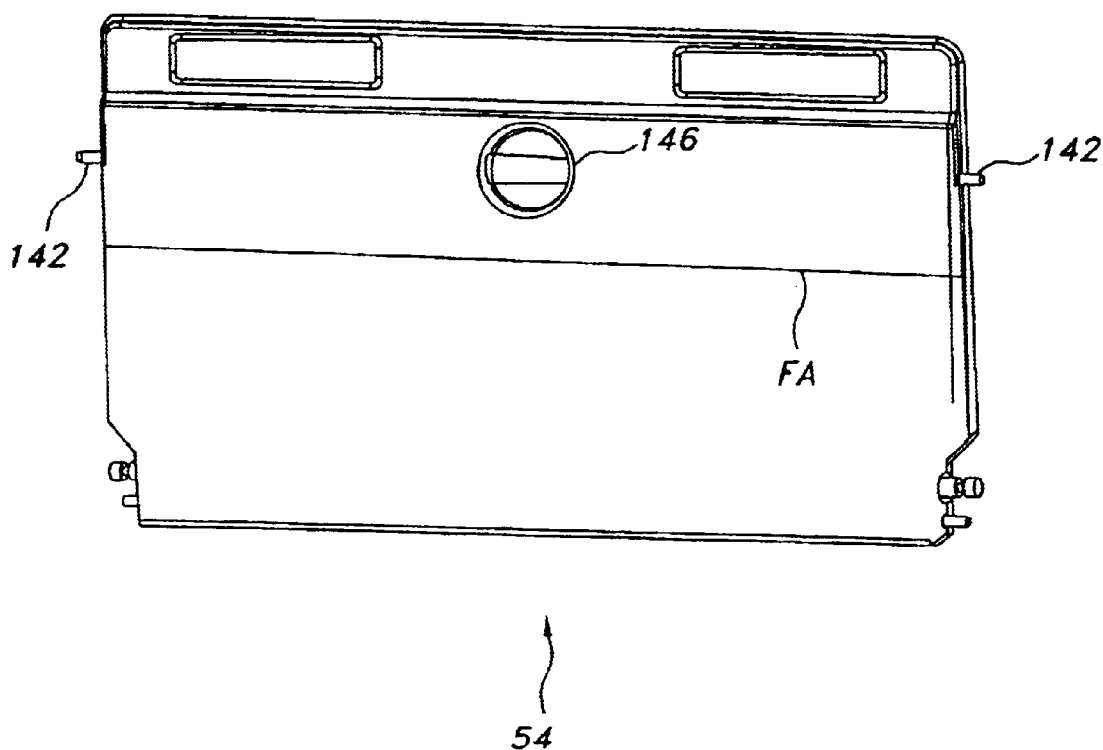
FIG. 8 illustrates aspects of the tray table of FIGS. 7A–D.

Engaging slots 140 in members 138 are rods or pins 142 (FIG. 8), which maintain table 54 in the undeployed condition. Pins 142, which may be retracted within table 54, extend outward from the sides of the table 54. By connecting pins 142 with knob 146 in a suitable manner, mechanism 50 permits a passenger P to deploy tray table 54 merely by rotating knob 146, which retracts pins 142 from slots 140 thereby freeing the table 54 from the members 138.

Because of the rotational and linear moveability of seat 10, it may be desirable for tray table 54 not to move identically. Elongated slots 140 thus permit backrest 14 to move substantially before mandating any corresponding movement of table 54. With backrest 14 in the upright position, as disclosed in FIG. 7A, pins 142 may be positioned at a first end 150 of slots 140. As backrest 14 reclines (FIG. 7B), members 138 move relative to pins 142 so that pins 142 ultimately approach second end 154 of slots 140. Readily apparent to skilled artisans that this approach avoids any need for an elongated, or "vertical" slot in the tray table 54, contrary to the teaching of the Hadden, Jr. patent.

Figure 7C:
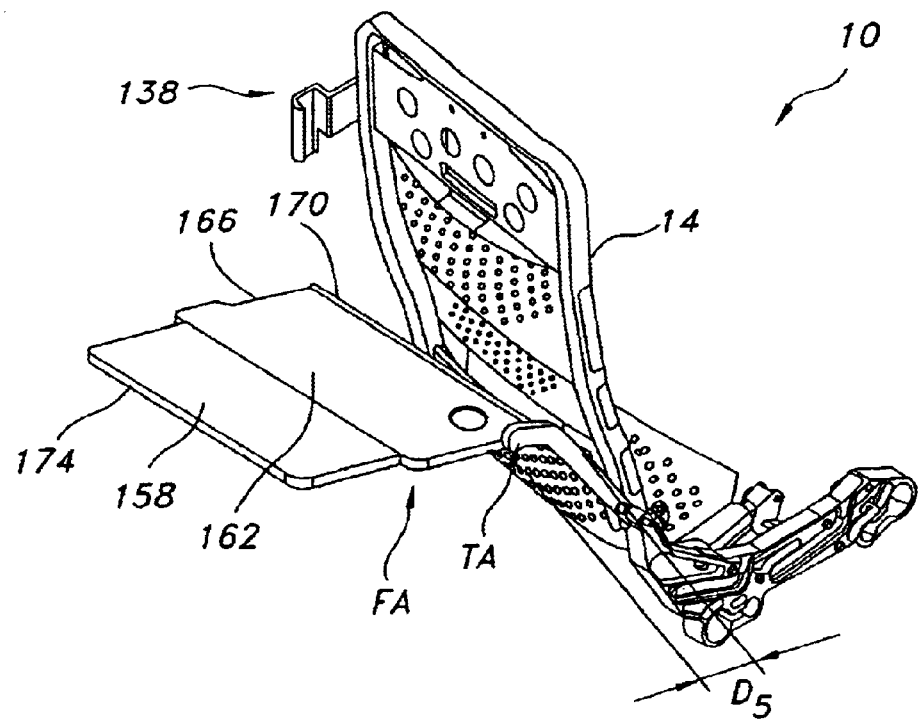
Figure 7D:
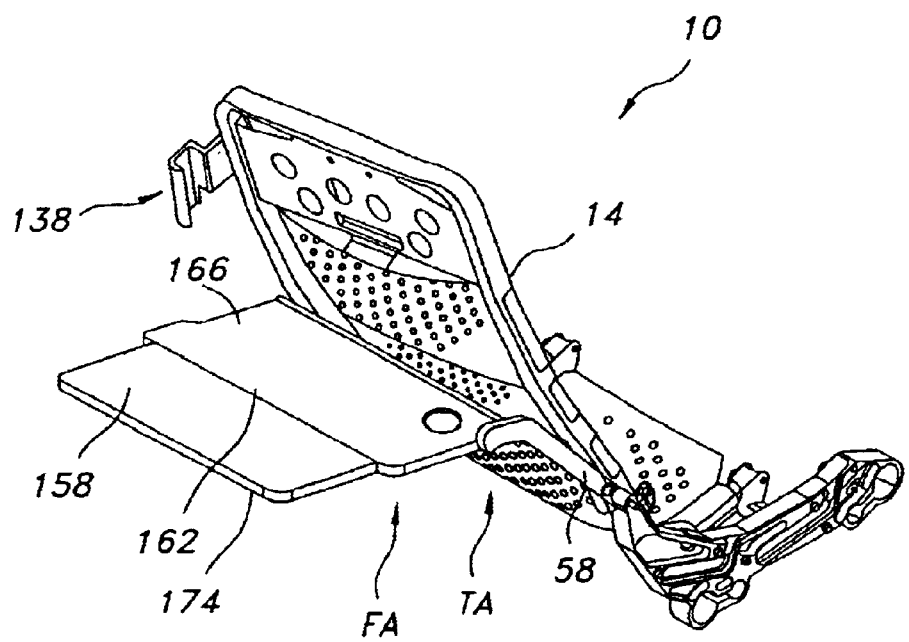

FIGS. 7C–D depict tray table 54 when deployed for use. In this condition, pins 142 have been retracted into the table 54 and the table 54 consequently released from members 138. Because table 54 may pivot about an axis TA where it connects to pivoting arms 58, the table 54 may be rotated by a passenger P to the position of FIGS. 7C–D. Table 54 additionally may be unfolded by rotating proximal part 158 about axis FA, so that the usable surface 162 of table 54 comprises both proximal part 158 and distal part 166. By making table 54 foldable, it may be stowed in a restricted amount of space (as may be present in the rear of backrest 14 if, for example, a monitor is also located in the rear) yet expandable to provide an adequate surface for use.

Unlike many existing tray table mechanisms, mechanism 50 places axis TA an appreciable distance $D_5$ from distal edge 170 of table 54. Greater balance and stability of table 54 results from this placement, particularly when weight or force is applied at or near the proximal edge 174 of table 54. Furthermore, if slots are included in the sides of table 54 (or in the arms 58) so that table 54 may slide relative to arms 58, it may be moved toward a passenger for use and away from the passenger for stowage.

FIGS. 9A–B and 10A–D show an alternative tray table mechanism 50'. Comprising table 54' and arms 58', mechanism 50' differs from mechanism 50 at least because it also comprises frame 178 present behind backrest 14. Frame 178 typically is attached to any of backrest 14, bottom 18, or frame 22 at the same location as arms 58' are attached. If frame 178 and backrest 14 include a complementary pin and slot-containing member, relative movement between the two may occur when backrest 14 is moved. By having table 54' latch to frame 178 rather than directly to backrest 14, suitable stowage of table 54' may occur again without requiring any elongated "vertical" slot in the table 54'.

The foregoing is provided for purposes of illustrating, describing, and explaining embodiments of the present invention. Further modifications and adaptations to these embodiments will be apparent to those skilled in the art and may be made without departing from the scope or spirit of the invention. Additionally, incorporated herein in their entireties by this reference are the contents of the Hadden, Jr. patent and Bentley application.

What is claimed is:

1. A seat comprising:
   a. a backrest;
   b. a seat bottom comprising:
      i. a rear portion connected to or integrally formed with the backrest; and
      ii. a forward portion connected to and able to pivot with respect to the rear portion;
   c. at least one track and follower assembly, at least a portion of the assembly being connected to the forward portion of the seat bottom; and
   d. a hydrolock connected to the forward portion of the seat bottom.

2. A seat according to claim 1 in which the assembly comprises at least one roller as a follower, further comprising a bell crank connected to both the hydrolock and the roller.

3. A seat according to claim 1 further comprising:
   a. a member (i) connected to or integrally formed with the backrest and (ii) having a slot defined therein, and
   b. a tray table comprising at least one pin adapted to be received by the slot when the tray table is stowed.

4. A seat according to claim 3 in which the pin is retractable, away from the slot, to permit the tray table to be released for use.

5. A seat comprising:
   a. a backrest;
   b. a seat bottom defining an interface with the backrest, having first and second sides, and comprising:
      i. a rear portion connected to or integrally formed with the backrest; and
      ii. a forward portion connected to and able to pivot with respect to the rear portion; and
   c. a plurality of track and follower assemblies on the first side forward of the interface, for permitting the seat bottom to translate forward.

6. A seat comprising:
   a. a backrest connected to or integrally formed with the seat bottom and adapted to rotate through an angle from an upright position to a reclined position while moving rearward a linear distance, the amount of the rearward linear distance being related to the amount of angular rotation such that, if the angle is approximately 16°, the rearward linear distance is substantially less than approximately 7.40 inches; and
   b. a seat bottom (i) that moves forward as the backrest rotates rearward from the upright position and (ii) comprises:
      A. a rear portion connected to or integrally formed with the backrest; and
      B. a forward portion connected to and able to pivot with respect to the rear portion.

7. A seat according to claim 6 in which, if the angle is approximately 16°, the rearward linear distance is less than approximately 4.50 inches.

8. A seat comprising:
   a. a generally vertically-oriented backrest adapted to rotate from an upright position to a reclined position;
   b. a generally horizontally-oriented seat bottom defining first and second opposed sides, the seat bottom (i) translating forward as the backrest rotates from the upright position to the reclined position and (ii) comprising:
      A. a rear portion connected to or integrally formed with the backrest; and
      B. a forward portion connected to and able to pivot with respect to the rear portion; and
   c. a plurality of track and follower assemblies protruding from each of the first and second opposed sides.

9. A seat according to claim 8 in which each track and follower assembly comprises a track and a roller received by and capable of travelling in the track.

10. A seat according to claim 8 further comprising a base frame to which at least the seat bottom is connected.

11. A seat comprising:
    a. a backrest selectively moveable by a passenger and having at least one member protruding rearward therefrom and defining a slot; and
    b. a tray table comprising at least one pin adapted to be received by the slot for stowage so that, when the tray table is stowed and the backrest moves as selected by the passenger, the pin changes position within the slot.

12. A seat according to claim 11 in which the pin is retractable so as to disengage from the slot for use.

13. A seat according to claim 12 further comprising a manually-operable knob, rotation of which either retracts or extends the pin.

14. A seat comprising:
    a. a backrest;
    b. a seat bottom comprising:
       i. a rear portion connected to or integrally formed with the backrest; and
       ii. a forward portion connected to and able to pivot with respect to the rear portion;
    c. at least one track and follower assembly, at least a portion of the assembly being connected to the forward portion of the seat bottom; and
    d. an actuator connected to the forward portion of the seat bottom.

15. A seat according to claim 14 in which (i) the assembly comprises at least one roller as a follower and (ii) the actuator is adapted to cause the roller to change position within the track.

* * * * *